April 11, 1939. W. V. THELANDER 2,153,945
TRAILER STEP
Filed Dec. 14, 1936
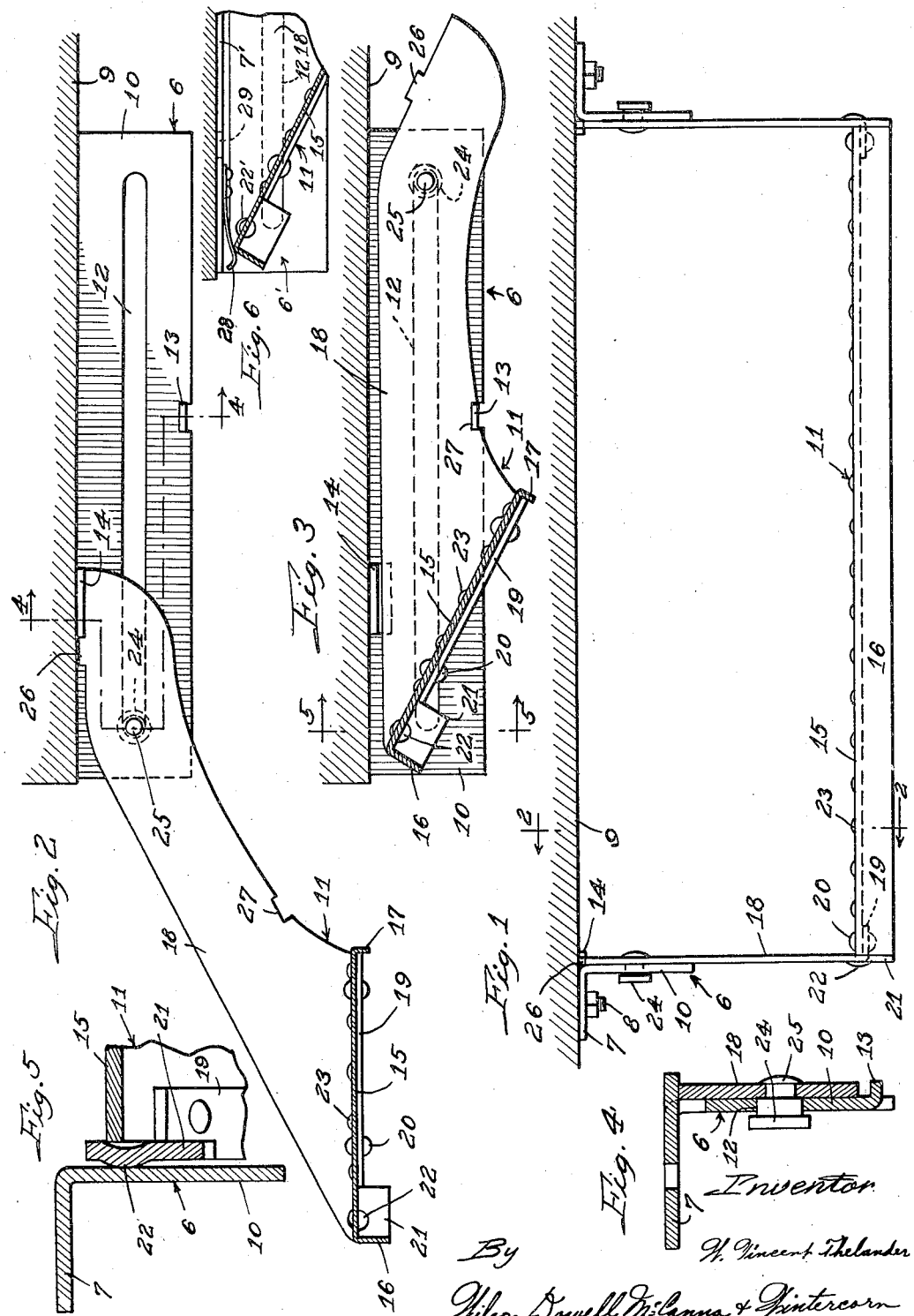

Patented Apr. 11, 1939

2,153,945

UNITED STATES PATENT OFFICE 2,153,945

TRAILER STEP

W. Vincent Thelander, Rockford, Ill., assignor to The Atwood Vacuum Machine Company, Rockford, Ill., a co-partnership composed of Seth B. Atwood and James T. Atwood Application December 14, 1936, Serial No. 115,751

10 Claims. (Cl. 280—166)

This invention relates to a foldable disappearing step, especially designed and adapted for use on automobile trailers, but, of course, suitable for other uses wherever the features of such a step might be desirable.

The principal object of my invention is to provide a step pivotally and slidably mounted on and between a pair of longitudinally slotted brackets and arranged to be moved from an operative position extending from one end of the brackets, to a retracted out-of-the-way position disposed bodily between and substantially within the length and in the plane of the two brackets.

Another object is to provide a step whose mounting is so designed and constructed that a sturdy and dependable step is provided in the extended position even though the step is movable to such position quickly and easily, the step being furthermore so designed and constructed that when it is moved to retracted position and locked in such position, there is no likelihood of its becoming accidentally released, nor of its developing undesirable play and consequent rattle.

A further object consists in providing a folding step constructed throughout from sheet metal for lightness and economy, the parts all being formed with a view to obtaining maximum strength and rigidity.

The invention is illustrated in the accompanying drawing, in which—

Figure 1 is a front elevation of a foldable step made in accordance with my invention;

Fig. 2 is a longitudinal section on the line 2—2 of Fig. 1, looking in the direction of the arrows;

Fig. 3 is a similar section, but showing the step folded;

Fig. 4 is a sectional detail on the broken line 4—4 of Fig. 2;

Fig. 5 is a sectional detail on the line 5—5 of Fig. 3, and

Fig. 6 is a sectional detail of a modified or alternative construction.

The same reference numerals are applied to corresponding parts throughout the views.

The brackets 6 are of sheet metal, bent to L-shaped cross-section so as to provide horizontal flanges 7 arranged to be bolted or otherwise suitably secured, as at 8, to the floor 9 of the trailer or other vehicle in connection with which the step is used. The part 9, broadly speaking, may be regarded as any suitable support wherever and on whatever a folding step like the one herein disclosed may be found useful. The vertical depending flanges 10 of the brackets 6 form supports and guides for the foldable step, indicated generally by the numeral 11, and these flanges are longitudinally slotted, as indicated at 12. A small lug 13 is bent inwardly from the lower edge of the flanges 10 at about the middle, and larger lugs 14 are struck from the flange 10 at the top near the front end, these being bent substantially into the plane of the flanges 7, as best illustrated in Fig. 4. The lugs 13, as will presently appear, support and lock the step 11 in its folded out-of-the-way position, and the lugs 14 provide abutments and supports for the step in its extended operative position, these lugs, by reason of their engagement with the floor 9, being adequately backed up to prevent bending under the load. The step 11 consists of a sheet metal tread member 15 flanged along the front and back, as at 16 and 17, both for neat appearance and reenforcement, and two sheet metal arms 18 fastened to the ends of the tread member 15 by means of flanges 19 riveted to the tread member, as at 20. A lug 21 on the end of each arm 18 next to the flange 19 abuts the adjacent end of the flange 16 to form the corner of the step and give a finished appearance. The arms 18 have small rounded bosses or cam projections 22 bent therefrom at the lugs 21, for a purpose to be pointed out later. The tread member 15 will preferably have similar rounded protuberances struck upwardly therefrom, as at 23, to provide a good anti-skid surface directly on the tread member instead of necessitating the application of a rubber mat or the like thereto.

The arms 18 have studs or pivots 24 riveted thereon, as at 25, and these studs are slidable freely in the slots 12 in brackets 6 while also securing the arms to the brackets. Lugs 26 project upwardly from the upper ends of the arms 18 and are so located that when the studs 24 are at the forward ends of the slots 12, these lugs engage in front of the lugs 14 on the brackets 6 (as shown in Fig. 2), whereby to releasably lock the step in its extended operative position while the step is supported partly by the studs 24 and partly by the lugs 14. The step 11 is therefore securely positioned and thoroughly dependable, and is furthermore sufficiently rigidly supported that it will not give under the weight of the average person standing or stepping thereon.

Notches 27 are provided in the lower edge of each of the arms 18 near the tread member 15, so located that when the studs 24 are at the inner or rear ends of the slots 12, the lugs 13 on the brackets 6 engage in these notches, as shown in Fig. 3, whereby to lock the step 11 releasably, but securely, in retracted out-of-the-way position. In folding the step 11 from the position of Fig. 2 to that of Fig. 3, it is raised sufficiently to disengage the lugs 26 from the lugs 14, and then slid inwardly toward the position shown in Fig. 3, the lugs 13 coming into engagement with the edges of the arms 18 at about the middle of the step's movement and affording support for the step the rest of the way, so that the operator is relieved of the burden and has only to slide the step on the lugs until the lugs engage in the notches 27. The operator can tell from the clicking sound when the lugs engage in the notches, and knows then that the step is fully locked and is not apt to move outwardly when the trailer is on the road. Just before the lugs 13 engage in the notches 27, the bosses 22 come into frictional engagement with the inside of the flanges 10 of the brackets 6 and place a definite frictional drag upon the further movement of the step, so that the operator knows when the step is almost home. This engagement of the bosses 22 with the brackets 6 also imposes a sufficient thrust upon the brackets to take up any play that there would otherwise be between the parts so that the assembly will not rattle when the vehicle is in motion. The fact that the step drops by gravity into locked position, that is, when the lugs 13 engage in the notches 27, is a factor which makes the accidental unlocking of the step unlikely, especially when there is in addition the frictional engagement of the bosses 22 with the brackets 6, tending to resist movement of the step relative to the brackets. The binding action between the step and brackets just referred to is, however, not great enough to make it at all difficult to release the step when it is to be moved out to its operative position. The operator can grasp the step by the flange 16 and raise it off the lugs 13 and pull it out easily enough.

Fig. 6 shows a modified or alternative construction in which the brackets 6' have their horizontal flanges 7' bent inwardly toward each other so as to be adapted to serve as supports for two leaf springs 28 that are arranged to engage the edge of the tread member 15 at opposite ends thereof when the step 11 is folded, whereby to keep the step securely locked on the lugs 13, and also eliminate play and thereby prevent rattling when the trailer is in motion. If desired, bosses like the bosses 22 previously described may be provided, as indicated at 22', in addition to the leaf springs 28. With this construction, I provide holes 29 in the flanges 7' arranged to receive the lugs 26 when the step is unfolded.

It is believed the foregoing description conveys a good understanding of the objects and advantages of my invention. The appended claims have been drawn with a view to covering all legitimate modifications and adaptations.

I claim:

1. A shiftable step comprising a pair of upright guiding and supporting brackets, each having a longitudinally extending, substantially horizontal guideway provided thereon, a step comprising a tread and opposed supporting arms on the ends thereof, pivots on the upper ends of the arms slidably supported in said guideways, said pivots providing part of the support for the step in its extended operative position at the front end of the guideways and also providing part of the support for the step in its retracted inoperative position, said pivots in the latter position of the step being disposed in the rear ends of said guideways, one or more projections on the front ends of said brackets for engagement with the upper ends of said arms to support the step rigidly in extended operative position, one or more other projections on said brackets downwardly spaced relative to the first-mentioned projections for engagement with said arms to support the step in retracted inoperative position, and one or more lugs on the upper end of said arms arranged to engage the first-mentioned projections on the brackets, whereby to releasably lock the step in extended operative position.

2. A shiftable step comprising a pair of upright guiding and supporting brackets, each having a longitudinally extending, substantially horizontal guideway provided thereon, a step comprising a tread and opposed supporting arms on the ends thereof, pivots on the upper ends of the arms slidably supported in said guideways, said pivots providing part of the support for the step in its extended operative position at the front end of the guideways and also providing part of the support for the step in its retracted inoperative position, said pivots in the latter position of the step being disposed in the rear ends of said guideways, one or more projections on the front ends of said brackets for engagement with the upper ends of said arms to support the step rigidly in extended operative position, one or more other projections on said brackets downwardly spaced relative to the first-mentioned projections for engagement with said arms to support the step in retracted inoperative position, and one or more recesses provided in said arms for reception of the last-mentioned projections on the brackets, whereby to releasably lock the step in retracted inoperative position.

3. A shiftable step comprising a pair of upright guiding and supporting brackets, each having a longitudinally extending, substantially horizontal guideway provided thereon, a step comprising a tread and opposed supporting arms on the ends thereof, pivots on the upper ends of the arms slidably supported in said guideways, said pivots providing part of the support for the step in its extended operative position at the front end of the guideways and also providing part of the support for the step in its retracted inoperative position, said pivots in the latter position of the step being disposed in the rear ends of said guideways, one or more projections on the front ends of said brackets for engagement with the upper ends of said arms to support the step rigidly in extended operative position, one or more other projections on said brackets downwardly spaced relative to the first-mentioned projections for engagement with said arms to support the step in retracted inoperative position, one or more recesses provided in said arms for reception of the last-mentioned projections on the brackets, whereby to releasably lock the step in retracted inoperative position, and one or more cam projections on the arms arranged to wedgingly and slidably engage portions of said brackets when the step is moved to retracted inoperative position, whereby to impose frictional drag on the movement of said arms relative to said brackets to resist accidental disengagement of the projections from the recesses.

4. A shiftable step comprising a pair of upright guiding and supporting brackets, each having a longitudinally extending, substantially horizontal guideway provided thereon, a step comprising a tread and opposed supporting arms on the ends thereof, pivots on the upper ends of the arms slidably supported in said guideways, said pivots providing part of the support for the step in its extended operative position at the front end of the guideways and also providing part of the support for the step in its retracted inoperative position, said pivots in the latter position of the step being disposed in the rear ends of said guideways, one or more projections on the front ends of said brackets for engagement with the upper ends of said arms to support the step rigidly in extended operative position, one or more other projections on said brackets downwardly spaced relative to the first-mentioned projections for engagement with said arms to support the step in retracted inoperative position, said brackets being formed of sheet metal to L-shaped cross-section, one flange of the brackets being adapted to be secured to a suitable support for the step, the first-mentioned projections comprising lugs struck from the sheet metal of said brackets substantially into the plane of the securing flanges so as to engage the support and be supported thereby against bending under load borne by the step in its extended operative position.

5. A device of the character described comprising two parallel laterally spaced elongated sheet metal brackets, each having a longitudinal slot provided therein, and a step adapted to be supported on said brackets comprising a tread member in a substantially horizontal plane parallel with the plane of said slots, and two parallel sheet metal arms rigidly secured to the opposite ends of said tread member and extending rearwardly therefrom in angular relation thereto upwardly toward the brackets for operation therebetween, each alongside one of said brackets, studs on said arms extending through said slots pivotally securing said arms to said brackets for sliding and pivotal movement relative thereto, the upper ends of said arms being formed to provide substantially horizontal supporting surfaces substantially parallel with the slots and tread member and extending rearwardly in relation to said studs, and means in rigid relation with the brackets providing substantially horizontal supporting surfaces at the tops thereof for engagement with the supporting surfaces on said arms.

6. A device of the character described comprising two parallel, laterally spaced, elongated sheet metal brackets, each having a longitudinal slot provided therein, and a horizontal tread member having two parallel sheet metal arms on the opposite ends thereof extending in angular relation thereto in substantially vertical planes, said arms being disposed between and adjacent said brackets, studs on said arms entered freely through said slots and securing said arms to said brackets for sliding and pivotal movement relative thereto, means in rigid relation with the brackets providing substantially horizontal supporting surfaces at the tops thereof, the upper ends of said arms having substantially horizontal edges in spaced relation to said studs for supporting engagement with said supporting surfaces when the tread is horizontally disposed in operative position with the studs at one end of the slots, and an inward projection on at least one of the brackets below the slot therein for engagement with the back of the adjacent arm when the tread is in out-of-the-way position with the studs in the other ends of the slots, said arm cooperating with said inward projection having a notch provided in the edge thereof to receive said projection to lock the tread detachably in the position described.

7. A device of the character described comprising two parallel, laterally spaced, elongated sheet metal brackets, each having a longitudinal slot provided therein, and a horizontal tread member having two parallel sheet metal arms on the opposite ends thereof extending in angular relation thereto in substantially vertical planes, said arms being disposed between and adjacent said brackets, studs on said arms entered freely through said slots and securing said arms to said brackets for sliding and pivotal movement relative thereto, means in rigid relation with the brackets providing substantially horizontal supporting surfaces at the tops thereof, the upper ends of said arms having substantially horizontal edges in spaced relation to said studs for supporting engagement with said supporting surfaces when the tread is horizontally disposed in operative position with the studs at one end of the slots, and an inward projection on at least one of the brackets below the slot therein for engagement with the back of the adjacent arm when the tread is in out-of-the-way position with the studs in the other ends of the slots, one of said arms having a rounded protuberance formed thereon adjacent the tread end thereof and arranged to come into wedging engagement with the adjacent bracket when the tread is moved to the out-of-the-way position.

8. A device of the character described comprising two parallel, laterally spaced elongated sheet metal brackets, each having a longitudinal slot provided therein, and a horizontal tread member having two parallel sheet metal arms on the opposite ends thereof extending in angular relation thereto in substantially vertical planes, said arms being disposed between and adjacent said brackets, studs on said arms entered freely through said slots and securing said arms to said brackets for sliding and pivotal movement relative thereto, means in rigid relation with the brackets providing substantially horizontal supporting surfaces at the tops thereof, the upper ends of said arms having substantially horizontal edges in spaced relation to said studs for supporting engagement with said supporting surfaces when the tread is horizontally disposed in operative position with the studs at one end of the slots, and an inward projection on at least one of the brackets below the slot therein for engagement with the back of the adjacent arm when the tread is in out-of-the-way position with the studs in the other ends of the slots, the aforesaid means in rigid relation with the brackets providing substantially horizontal supporting surfaces comprising projections on said brackets for supporting engagement with the horizontal upper ends of said arms, and at least one of said arms having a shoulder projecting upwardly from the upper end thereof for engagement in front of the aforesaid projection on the bracket to retain the arms in extended operative relation to the brackets.

9. A shiftable step comprising a pair of upright elongated, longitudinally slotted, sheet metal guiding and supporting brackets, each of the slots providing a longitudinally extending, substantially horizontal guideway, a step comprising a tread and opposed supporting arms on the ends thereof, pivots on and spaced from the upper ends of the arms slidably supported in said guideways, a projection rigid with at least one of said brackets arranged to be engaged by the upper end of the related one of said arms when the pivots are in the front ends of the slot guideways, whereby to support the step rigidly in relation to the brackets in extended operative position, and another projection rigid with at least one of the brackets arranged to be engaged by the lower end of the related one of said arms when the pivots are in the rear ends of the slot guideways, whereby to support the step substantially in the plane of said brackets in inoperative retracted position, said first-mentioned projection being arranged to have interlocking engagement with the associated arm to hold the stop releasably in extended operative position.

10. A shiftable step comprising a pair of upright elongated, longitudinally slotted, sheet metal guiding and supporting brackets, each of the slots providing a longitudinally extending, substantially horizontal guideway, a step comprising a tread and opposed supporting arms on the ends thereof, pivots on and spaced from the upper ends of the arms slidably supported in said guideways, a projection rigid with at least one of said brackets arranged to be engaged by the upper end of the related one of said arms when the pivots are in the front ends of the slot guideways, whereby to support the step rigidly in relation to the brackets in extended operative position, and another projection rigid with at least one of the brackets arranged to engage in a recess provided therefor in the lower end of the related one of said arms when the pivots are in the rear ends of the slot guideways, whereby to support and releasably lock the step substantially in the plane of said brackets in inoperative retracted position.

W. VINCENT THELANDER.